United States Patent Office 3,752,854
Patented Aug. 14, 1973

3,752,854
HOMOPOLYMERS OF N - (2 - HYDROXYETHYL) AZIRIDINES AND N-(2-THIOETHYL)AZIRIDINES AND A METHOD OF PREPARATION
Donald A. Tomalia and Narayanlal D. Ojha, Midland, Mich., assignors to The Dow Chemical Corporation, Midland, Mich.
No Drawing. Filed Jan. 28, 1970, Ser. No. 6,558
Int. Cl. C07c 93/02
U.S. Cl. 260—584 B
17 Claims

ABSTRACT OF THE DISCLOSURE

Homopolymers of aziridines having the structural formula

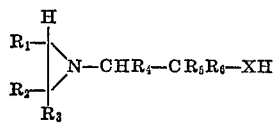

wherein X is oxygen or sulfur, $R_1$-$R_5$ are hydrogen or hydrocarbon groups, and $R_6$ is hydrogen, a hydrocarbon group or

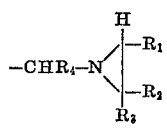

or

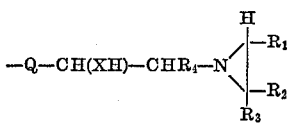

wherein Q is an inert divalent organic radical, are prepared in a polymerization reaction which comprises maintaining said monomer(s) in liquid phase with sulfur dioxide until the polymeric product is formed. The polymers are obtained as a complex with $SO_2$, and $SO_2$ may be included within the backbone structure, e.g., as a sulfite linkage. The polymers are useful as flocculants and as fugitive sizing agents. For example, N-(2-hydroxyethyl) aziridine homopolymerizes in liquid sulfur dioxide at a temperature of —10° C. to give a polymer having the repeating unit $\{CH_2CH_2-NH-CH_2CH_2O\}$ as a complex with $SO_2$.

BACKGROUND OF THE INVENTION

The aziridinyl monomers in the subject reaction are known compounds generally prepared by reacting aziridine (ethylenimine) or a C-substituted aziridine with a vicinal epoxide or episulfide. E.g. aziridine reacts with propylene oxide to produce N-2-hydroxypropyl) aziridine. This reaction is further illustrated in U.S. Pats. 3,006,912 and 3,296,200.

Previous attempts to homopolymerize the sulfur-containing monomers, e.g.,

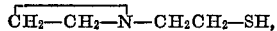

resulted in the formation of highly cross-linked, water-insoluble polymers, as illustrated by U.S. Pat. 3,335,116.
Previous attempts to homopolymerize the N-(2-hydroxyethyl)aziridines have resulted in polymerization occurring through the aziridine ring, exclusive of the hydroxy group. E.g., polymerization of N-(2-hydroxyethyl) aziridine in the presence of a Brønsted or Lewis acid resulted in the production of polymer having the repeating unit $\{CH_2CH_2-NH(CH_2CH_2OH)\}$.

SUMMARY OF THE INVENTION

It has now been discovered that novel, substantially linear homopolymers of aziridines having the structural formula (I) 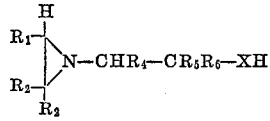

wherein X is oxygen or sulfur; $R_1$-$R_5$ are hydrogen or inert hydrocarbon groups; and $R_6$ is hydrogen, an inert hydrocarbon group,

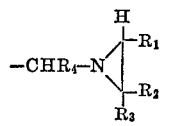

or

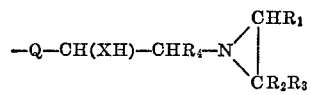

wherein Q is an inert divalent organic radical, are prepared in a novel head-to-tail type polymerization reaction, thus producing polymers wherein alkylenimino and alkylenoxy groups alternate in the backbone chains of the polymer. Said reaction comprises maintaining the monomer(s) in liquid phase with sulfur dioxide until the desired polymeric product is formed. The polymers are obtained as a complex with $SO_2$ (i.e., as an $SO_2$ complex with a plurality of the amino groups in the polymer); and, in those instances wherein at least an equimolar amount of $SO_2$ is used in the process, based on the monomer, $SO_2$ is additionally included within the backbone of the chain (e.g., as a sulfite linkage). The polymer —$SO_2$ complexes are useful as flocculants and as fugitive sizing agents.

By an "inert" hydrocarbon group is meant a hydrocarbon group which is inert in the process and which does not prohibit the reaction by steric interference.

The novel homopolymers are characterized by their substantially linear backbone structure which, exclusive of any terminal or chain-extending groups, consists essentially of the repeating unit.

(II) $\{CHR_1-CR_2R_3-NH-CHR_4-CR_5R_6-X\}_n$, wherein X and $R_1$-$R_6$ have the above meanings and $n$ is an integer from 2 to about 15 or more. They are obtained as stable water-soluble $SO_2$ complexes which may have $SO_2$ included within the polymer backbone.

The polymers having $SO_2$ in the backbone are water-soluble and can be hydrolyzed with acid or base to form low molecular weight products corresponding to ring-opened monomers or dimers. Hence, they can be used as (a) flocculants in a conventional manner, or (b) as fugitive sizing agents for textiles and paper. By fugitive sizing agent is meant a sizing agent which can be applied to the fabric or paper to give good sizing properties and as a subsequent step (when the sizing agent is no longer needed in the fabric or paper) merely hydrolyzing the polymer. Typically, an aqueous solution of the polymer and conventional means of applying sizing (such as spray or dip applications) are used.

Aqueous solutions of the subject polymer —$SO_2$ complexes generally have a pH of from about 5 to 7.

AZIRIDINYL MONOMERS

Suitable monomers for use in the invention are generically represented by I. Typically, $R_1$-$R_5$ are hydrogen or hydrocarbyl radicals of from 1 to about 20 carbon atoms (preferably 1 to about 5 carbon atoms) such as alkyl, aryl, alkaryl, aralkyl, cycloalkyl, alkenyl or a halo-substituted alkyl or aryl radical, or a hydrocarbyl radical of from 1 to about 20 carbon atoms (preferably 1 to about 5 carbon atoms) whose chain-length is interrupted by an atom(s) of oxygen or sulfur, such as alkoxyalkyl, aroxyalkyl, alkenyloxyalkyl, etc. $R_6$ is of the class of $R_1$ or is

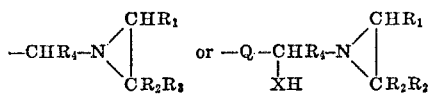

When $R_6$ is either of the latter two values, chain extended and/or cross-linked polymers are obtained. In the above, Q is an inert divalent radical such as oxygen; sulfur; alkylene, such as ethylene, butylene, decylene, and the like; arylene, such as phenylene, and the like; oxa- and thia-alkylene and arylene, such as $C_2H_4O$—$C_2H_4$—, —$C_3H_6SC_3H_6$—, —$C_6H_4$—O—$C_6H_4$—, —$C_6H_4SC_6H_4$—, $(C_6H_4)_2S$, and the like; polyalkylene and polyarylene oxides and sulfides, such as $(C_2H_4O)_nC_2H_4$—, wherein $n$ is an integer from 2 to about 100 or more, and the like, or the ring-opened residue of diglycidyl ether or the diglycidyl ether of Bisphenol A,

—$CH_2$—CH(OH)—$CH_2$—O—$CH_2$—CH(OH)—$CH_2$— and $(CH_2$—CH(OH)$CH_2$—O—$C_6H_4$—C(OH$_3$)$_2$—
$(C_6H_4$—O—$CH_2CH(OH)$—$CH_2)$ respectively, and the like.

Preferred monomers are those wherein $R_1$, $R_4$ and $R_5$ are hydrogen, $R_2$ and $R_3$ are hydrogen, methyl or ethyl, and $R_6$ is hydrogen or of the class of $R_1$ having from 1 to about 20 carbon atoms (particularly methyl, ethyl, phenyl, or allyloxy methyl); and the most preferred monomers are those wherein $R_1$, $R_4$, $R_5$ and $R_6$ are each hydrogen and $R_2$ and $R_3$ are hydrogen, methyl or ethyl. Typically, the hydroxy-containing monomers (X is oxygen) are preferred over their sulfur analogs.

The monomers are conveniently prepared by reacting an epoxide (or polyepoxide) or episulfide (or polyepisulfide) with an aziridine. This reaction is well known, for example, see "Ethylenimine and Others Aziridines" by O. C. Dermer and G. E. Ham, Academic Press, N.Y. (1969) p. 123 and pp. 126–131.

Examples of suitable monomers include N-(2-hydroxyethyl)Az, wherein Az is aziridine, N-(2-hydroxypropyl)Az, N-(2-hydroxybutyl)Az, N-(2-hydroxyphenethyl)Az, N-(2-hydroxyoctyl)Az, N-(2-hydroxydodecyl)Az, N-(2-hydroxyoctadecyl)Az, the reaction product of 2 moles of aziridine, with 1 mole of the diglycidyl ether of Bisphenol A; the reaction product of allyl glycidyl ether with aziridine, N(2-chlorophenyl-2-hydroxyethyl)Az, and the like and the corresponding compounds wherein Az is replaced with 2-methyl-Az, 2,2-dimethyl-Az, 2-ethyl-Az, 2-butyl-Az, 2-phenyl-Az, 2-tolyl-Az, 2-phenethyl-Az, 2-cyclohexyl-Az, 2-(4-chlorophenyl)methyl-Az, and the like, and the corresponding sulfur analogs. Other named examples are found on pp. 128–130 in the "Ethylenimine and Other Aziridines" reference; such examples are incorporated by reference thereto.

SO$_2$ CATALYST

SO$_2$ is the reaction catalyst and must be used in at least catalytic amount but may be used in large excess as a solvent. To obtain a polymer having little if any SO$_2$ included within the polymer backbone, SO$_2$ is used in less than stoichiometric amounts (less than 1 mole of SO$_2$ per mole of monomer) and to obtain polymer having SO$_2$ included within the polymer backbone, SO$_2$ is used in at least stoichiometric amounts.

PROCESS CONDITIONS

The reaction temperature and pressure may suitably be any temperature below the critical temperature of SO$_2$ and any pressure so long as the reaction mixture comprising SO$_2$ and aziridinyl monomer(s) is maintained in a substantially liquid phase. The reaction rate increases in direct proportion to temperature and in inverse proportion to the number of and/or bulk of the substituents on the aziridine monomers. E.g., N-(2-hydroxyethyl)aziridine polymerizes faster than N-(2-hydroxyethyl)-2,3,3-trimethylaziridine and also faster than N-(2-hydroxyphenethyl)aziridine. For most reactants, the reaction proceeds at an acceptable rate at temperatures between about —15° C. and about 50° C. Accordingly, a suitable reaction temperature is between about —15° C. and about 150° C., while a temperature of from about —15° C. to about 50° C. is preferred.

The reaction time varies from a few minutes to a few hours depending upon the reaction temperature and reactivity of the monomer(s). In most instances, reaction times up to about 24 hours have been advantageous.

The reaction may be advantageously conducted in SO$_2$ or an inert reaction medium. For instance, the reaction can be conducted in benzene, toluene, xylene, carbon tetrachloride, and other like compounds.

The SO$_2$ and aziridine monomer can be mixed in any order, i.e., aziridine can be added to liquid SO$_2$ (and vice versa) or gaseous SO$_2$ can be bubbled into the liquid aziridine, or in some instances, merely passing gaseous SO$_2$ over the aziridine monomer is sufficient to cause the polymerization to occur. The reaction is highly exothermic and normal precautions should be exercised.

SPECIFIC EMBODIMENTS

The following examples further illustrate the invention:

EXAMPLE 1

Homopolymerization of N-(2-hydroxyethyl)aziridine

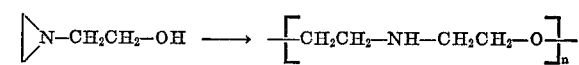

N-(2-hydroxyethyl)aziridine (8.7 g., 0.1 mole) in 20 ml. of CCl$_4$ was added with stirring at —15° C. over a 0.5 hour interval to a liquid mixture of 50 ml. of SO$_2$ and 20 ml. of CCl$_4$. The reaction mixture was then stirred at room temperature for about 15 hours during which time the excess SO$_2$ evaporated. The resulting SO$_2$-polymer complex was a hygroscopic, brown, gummy, water-soluble material. The complex was converted to the corresponding hydrochloride salt by adding concentrated hydrochloric acid. The free base polymer (mol. wt. 267) was obtained as a light yellow, viscous liquid by reacting the polymer-hydrochloride salt with aqueous caustic or with "Dowex-1" ion-exchange resin (OH$^\ominus$ form). The nuclear magnetic resonance (NMR) spectrum was consistent with the above structure. Elemental analysis of the free base polymer indicated that it contained 13.4% nitrogen and that 92.4% of the total nitrogen was primary or secondary nitrogen. The bands which are characteristic of the aziridine ring were not observed in the infrared (IR) spectrum of the polymer.

To 50 ml. of a 7.5% illite clay suspension in water in a 50 ml. graduated cylinder was added 0.25 ml. of an aqueous solution (5% by weight) of the polymer —SO$_2$ complex. The ingredients were thoroughly mixed and the time for the interface of the descending flocculated solids and the supernatant liquid to recede from the 50 ml. to the 25 ml. mark was 8 min. 50 sec. In a similar test using 1 ml. of the same polymer —SO$_2$ solution, the same measure of flocculation occurred in 5 min. 27 sec. In a blank sample (no flocculant used), the material settled from the 50 ml. to the 25 ml. mark in 13 min. In another test, 2 ml. of an aqueous solution (5% by weight) of the neutralized polymer (free amine form)

was evaluated and the same measure of flocculation occured in 5 min. 10 sec. Hence, the polymer-$SO_2$ complex has approximately twice the flocculating activity of the neutralized polymer.

In a similar experiment, acetonitrile (75 ml.) replaced carbon tetrachloride as the solvent. Two molecular weight polymer-$SO_2$ fractions were obtained upon distillation under reduced pressure, i.e., 422 and 263.

EXAMPLE 2

Homopolymerization of N-(2-hydroxypropyl)aziridine

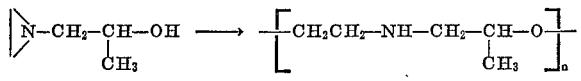

N-(2-hydroxypropyl)aziridine (5.1 g., 0.05 mole) in 25 ml. of $CCl_4$ was added with stirring and cooling at $-15°$ C. over a 10 min. time interval to 50 ml. of liquid $SO_2$. The mixture was stirred for 3 hours at about $-15°$ C. and then warmed to room temperature over a period of 15 hours. The supernatant solvent layer was decanted and the residue placed under vacuum for several hours. The crude product (9.1 g.) was a free-flowing pale yellow solid. The free-amine polymer (mol. wt. 301) was obtained by treating an aqueous solution of the above residue with an ion-exchange resin in the hydroxyl form (Amberlite-93 washed with caustic) for 2 hours, filtering off the resin and removing the volatiles under reduced pressure. The product (3.6 g.) was obtained as pale tan-colored flakes. The NMR spectrum was consistent with the proposed structure. Elemental analysis for nitrogen showed 9.2%. Primary and secondary nitrogen was 97.4% of total nitrogen.

EXAMPLE 3

Homopolymerization of N-(2-hydroxypropyl) aziridine—gaseous sweep of $SO_2$

N-(2-hydroxypropyl)aziridine (ca. 10 g.) was placed in a reaction vessel purged with dry nitrogen. Gaseous $SO_2$ was then swept across the surface of the aziridine monomer. The pot temperature rose from room temperature to about 200° C. in approximately 60 seconds and then resided. The polymer —$SO_2$ complex was a brown viscous liquid having a molecular weight of 608. Primary and secondary nitrogen was 91% of total nitrogen.

EXAMPLE 4

One tenth mole of N-(2-hydroxypropyl)aziridine was mixed with 0.1 mole of $SO_2$ in acetonitrile. The mixture was stirred at room temperature to remove any volatiles and warmed at 50° C. for 1 hour. The molecular weight of the product was 938. Percent nitrogen, 11.39.

The product was neutralized to the free amine form by treating an aqueous solution of the polymer with HCl to give the hydrochloride followed by neutralization of the salt with aqueous caustic. The neutralized product was an off-white colored liquid; mol. wt. 188. Primary and secondary nitrogen was 95.4% of the total nitrogen.

EXAMPLE 5

Homopolymerization of N-(2-mercaptoethyl)-2-methyl-aziridine

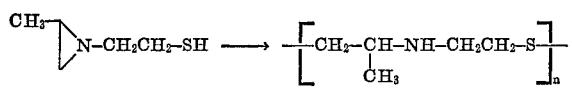

N-(2-mercaptoethyl)-2-methylaziridine (5.85 g., 0.05 mole) in 20 ml. of $CCl_4$ was added to 50 ml. of liquid $SO_2$ at $-15°$ C. over a period of 5–10 min. The reaction mixture was stirred for 3 hours at $-15°$ C. then warmed to room temperature. The volatiles were removed from the orange-yellow, $CCl_4$ insoluble residue under reduced pressure to give a quantitative yield of a tan-colored, solid, water-soluble polymer (mol. wt. 424).

The products from Examples 2–5 are useful as flocculants in the test described in Example 1. Other polymers produced by the subject process have similar flocculating activity. The products of the examples are also useful as fugitive sizing agents.

We claim:

1. A process for producing polymers having alternating alkylenimino and alkylenoxy groups in the backbone chain, said process comprising reacting by contacting at a temperature of from about $-15°$ C. to about 150° C. and in substantially liquid phase (a) sulfur dioxide and (b) an aziridine corresponding to the formula

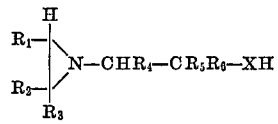

wherein X is oxygen or sulfur; $R_1$–$R_5$ are each independently hydrogen, hydrocarbyl or halo-substituted hydrocarbyl of from 1 to about 20 carbon atoms or a hydrocarbyl radical of from 1 to about 20 carbon atoms whose chain length is interrupted by at least one atom of oxygen or sulfur; $R_6$ is of the class of $R_1$ or is

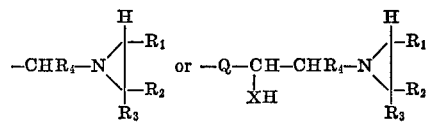

wherein X and $R_1$–$R_4$ have the aforesaid meaning and Q is an inert divalent radical; (a) being present in at least a catalytic amount.

2. The process defined in claim 1 wherein said temperature is from about $-15°$ C. to about 50° C.

3. The process defined in claim 1 wherein $R_1$–$R_5$ are hydrogen, alkyl, aryl, alkaryl, aralkyl, cycloalkyl, alkenyl, alkoxyalkyl, aroxyalkyl, alkenyloxyalkyl or halo-substituted alkyl or aryl.

4. The process defined in claim 3 wherein $R_1$, $R_4$ and $R_5$ are each hydrogen; $R_2$ and $R_3$ are hydrogen, methyl or ethyl; and $R_6$ has the aforesaid meaning.

5. The process defined in claim 4 wherein $R_6$ is hydrogen, methyl, ethyl, phenyl or allyloxymethyl.

6. The process defined in claim 5 wherein $R_6$ is hydrogen.

7. The process defined in claim 1 wherein X is oxygen.

8. The process defined in claim 5 wherein X is oxygen.

9. The process defined in claim 6 wherein X is oxygen.

10. The product produced by the process of claim 1.

11. The product produced by the process of claim 4.

12. The product produced by the process of claim 5.

13. The product produced by the process of claim 6.

14. The product produced by the process of claim 7.

15. The product produced by the process of claim 8.

16. The product produced by the process of claim 9.

17. The process defined in claim 1 wherein the molar ratio of (a) to (b) is at least 1.

References Cited

UNITED STATES PATENTS

| | | | |
|---|---|---|---|
| 3,166,590 | 1/1965 | Tsou | 260—2 EN |
| 3,471,564 | 10/1969 | Hickner | 260—583 EE |
| 3,574,698 | 4/1971 | Brois et al. | 260—583 EE |

LEWIS GOTTS, Primary Examiner

C. F. WARREN, Assistant Examiner

U.S. Cl. X.R.

260—2 EN, 239 E, 563 R, 563 C, 570 R, 570.5 P, 570.6, 570.8 R, 583 EE

UNITED STATES PATENT OFFICE
CERTIFICATE OF CORRECTION

Patent No. 3,752,854    Dated August 14, 1973

Inventor(s) Donald A. Tomalia and Narayanlal D. Ojha

It is certified that error appears in the above-identified patent and that said Letters Patent are hereby corrected as shown below:

Col. 2, line 5, the formula should read as follows:

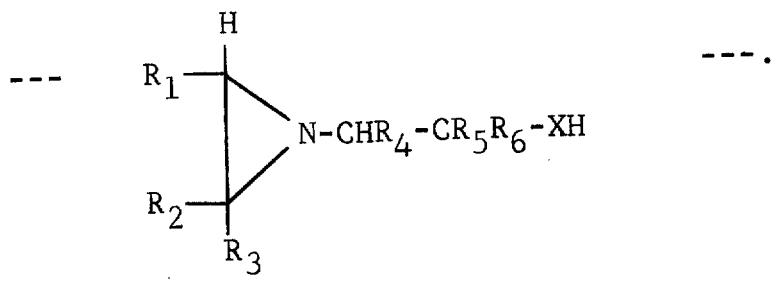

Col. 3, line 10, the second formula should read as follows:

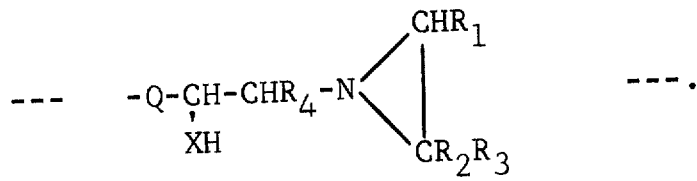

Signed and sealed this 25th day of December 1973.

(SEAL)
Attest:

EDWARD M. FLETCHER, JR.
Attesting Officer

RENE D. TEGTMEYER
Acting Commissioner of Patents